Nov. 2, 1937. A. MADLÉ 2,097,631
POWER TRANSMISSION MECHANISM
Filed Dec. 9, 1932 4 Sheets-Sheet 2

INVENTOR
Alain Madlé
BY *William Bluck*
ATTORNEY

Patented Nov. 2, 1937

2,097,631

UNITED STATES PATENT OFFICE 2,097,631

POWER TRANSMISSION MECHANISM

Alain Madlé, New York, N. Y., assignor to Erban Operating Corporation, New York, N. Y., a corporation of New York Application December 9, 1932, Serial No. 646,458

18 Claims. (Cl. 74—200)

This invention relates generally to power transmission mechanisms of the type requiring a continuous, adhesive operative connection between the driving and driven members and more particularly to transmissions of this type where the speed ratio or the leverage between input and output shaft is continuously variable, and I have therefore herein disclosed my invention as embodied in an adhesive system comprising races and rolling bodies. It will be understood, however, that as to features of my invention capable of more general application, my invention is not to be so restricted, unless the language of the claims specifically call therefor.

A power transmission employing adhesive contact must employ some arrangement for applying at the points of contact a pressure correctly proportioned to the load. In arrangements to which this invention has reference, such pressure is in the form of an axial component developed from the torque or circumferential force by means of a converting device positioned in the line of power transmission and to be hereafter referred to as "a torque-loading device."

Where the torque-loading device is positioned in the line of transmission of the input power to the adhesive system, such a device can be arranged as to give the correct pressures without substantial time lag for all torque changes from the input end for a fixed ratio of transmission. Since, however, the pressures developed at changing ratios of transmission remain constant for a given input torque, whereas, the required pressures vary with changing ratios, this manner of association of a torque-loading device for a variable transmission, to provide sufficient pressure for all ratios will apply an over-load at all ratios, except that at which the required pressure equals the applied pressure.

In addition, such an arrangement will be effective within the limits above set forth only where the torque changes, impacts or shocks are transmitted to the adhesive system through the torque-loading device. It will not be effective for shocks or torque changes originating elsewhere and not so transmitted, because such last mentioned changes being delivered first directly to the points of adhesive contact, will break the adhesive contact of the system and will not be transmitted to the torque-loading device for compensation therefor by it and in the absence of a special provision to prevent such an occurrence, the adhesive contact will remain broken until restored from the other side.

Where I have attempted to avoid the breaking of the adhesive contact when shocks originate at such opposite end of the system by making special provision thereagainst as by employing an arrangement which will supplement the required pressure developed by a torque with an excess of pressure to counteract the shock, such means will fall short of the desired aim in that, as the increased torque or the shock is transmitted first to the points of adhesive contact and then through these points to the torque-loading device to generate the required pressure, which is then transmitted back to the points of contact, the time lapse (hereinafter referred to as the time lag) between the application of a shock to the points of contact and the compensation therefor at such points, no matter how short will be sufficient to break the driving connection, if the shock is sufficiently sudden. Furthermore, the employment of such pressure applying means, to supplement the torque-loading device, for the purposes suggested, entails the application at all times to the points of adhesive contact, of a pressure in excess of that required, an excess which increases as provision is made for compensating for shocks of increased gradients.

In an application copending herewith, I show, in addition to the employment of a torque-loading device positioned to one side, i. e., the input side of the points of adhesive contact for causing the system to be immediately responsive to torque changes originating to that side, an arrangement in the form of a second torque-loading device, at the other side or output side of the system responsive to torque changes originating to that side, so that from whichever side the change in power flow incident to torque change originates, the arrangement responsive to such change for compensating therefor, will be on that side for such purpose.

While the additional torque-loading device in the output side will function properly for a predetermined transmission ratio for which it is devised, it will of necessity provide an overload for all variations from such predetermined ratio because, whereas the pressures will increase in reverse ratio to the speed changes, such is not the case of the pressure requirements of the system. One of the objects of my invention is therefore the provision of an arrangement whereby the pressure developed by a torque-loading device will at all times be sufficient and yet at no time be considerably in excess of the changing pressure requirements of speed ratio changes.

Another object of my invention is the provision of an arrangement whereby a single torque-loading device can be so devised and associated that it will function to develop and apply without a time lag, the correct pressures for all torque changes incident to power flow originating at any point in the system.

In the transmission system herein disclosed, the flow of power to the adhesive system is along one line of transmission from one end and along another line of transmission to the system from the other end. Such a system as a whole can be viewed as a leverage system of the first class which has a fulcrum about which the entire system pivots and at which point all the torques throughout the system react so as to give at this fulcrum point a torque reaction which is the resultant of all the torques present incident to the power flow along the different lines of transmission to the system. The torque reaction at such fulcrum point therefore will at all times be truly indicative of all the torques existing throughout the leverage system presented by such transmission and such torque reaction at the fulcrum will accurately correspond in its changes to the changes of all the torques throughout the system.

I attain the general objects of my invention by so associating a torque-loading member as to cause it to respond to the torque reaction present in the system.

In the embodiment herein specifically disclosed, the adhesive system is shown as of the type in which the races are the driving and driven members of the system, and the rolling bodies serve as a transmission means between the two, and are shown as associated together by means of a carrier to form a unitary roller assembly. Therefore, for purposes of treatment of this particular system as a leverage system, the roller carrier or cage can be assumed to be the fulcrum about which the entire system pivots and the reactions of the torques upon the carrier can be accepted as being the resultant of all of such torques or torque changes and as responding to all torque changes throughout the system.

It is therefore a further object of my invention to so devise and associate a torque-loading device that it will develop an axial component that will correspond to reaction torques existing in this carriage, and that will vary in proportion to the changes in such reaction torques, and this I attain in the illustrated embodiment by associating the torque-loading device directly with the roller system, and more particularly in so associating it that the torque-loading device will convert the reaction torques present in the roller carrier, into an axial component which will therefore always be properly proportioned to the reaction torque and therefore always in accordance with the requirements of all of the torques throughout the whole system.

In the specific construction disclosed in the drawings, I accomplish this by so connecting the roller carrier to the torque-loading device that the tendency of any power flow to rotate the carriage will manifest itself in the operation of the torque-loading device, and for this purpose, I support my carriage for rotation with reference to the axis of transmission only, however, within the limits permitted by the torque-loading device, and only for the purpose of operation of the torque-loading device.

It will, of course, be understood that the character of torque-loading device and its manner of association herein disclosed is merely by way of exemplification of one of the many arrangements for attaining my objects in the specific embodiment illustrated in the drawings. For example, the transmission system might have all of its three members free to rotate, one of the members rotating at a speed which is the resultant of the other two. Or the transmission might be a compound transmission comprising a plurality of transmissions, either in series or in parallel or partly in series and partly in parallel, and in this case there may be more than one fulcrum, one of which can be selected as the main fulcrum and the others as subsidiary fulcrums.

In addition to the attainment of all of the objectives above set forth, my invention attains the further objectives in that the manner of association of the torque-loading member with the roller carriage or cage as herein set forth when analyzed permits this torque-loading device to act additionally as a resilient buffer to reduce the intensity and gradient of impacts to the system and might be used wholly for this purpose and apart from the purposes already set forth above.

In a system of races and rollers devised for speed variation, the attainment of such variation by a simultaneous angling control of all the rollers for rolling tilting purposes, introduces a high element of shift resistance and it is one of the objects of my invention to provide an arrangement whereby the tilting of all of the rollers is accomplished merely by the control of one of them, the remaining rollers being shifted through the cooperation of the rotating races and the controlled roller.

This arrangement for controlling only one of the rollers is of particular importance in connection with the reaction torque-loading because additionally it eliminates as a variant factor in the control of the torque-loading by means of the rotation of the carriage, all factors except the specific means for angling the single control roller.

My new arrangement for tilting the rollers by the control of a single roller will therefore have one aspect of general utility in systems of this character generally, and will have a second aspect of specific utility in connection with reaction torque-loading.

For the attainment of these objects and such other objects as may hereinafter appear or be pointed out, I have illustrated embodiments of my invention in the drawings, wherein.

Before proceeding to describe my improvements, I will premise that in the embodiment illustrated in Figure 1 of the drawings my invention is shown applied to a transmission system comprising races 11 and 11' each provided with a toric face 12 or 12', (hereinafter referred to as races) positioned in symmetrically opposed relation, and rolling bodies shown as in the form of rollers 13 received between them, and each provided with an annular contact surface 14.

My invention involves (a) a new and improved arrangement whereby pressure applied at the points of adhesive contact is always sufficient for the requirements regardless of the point of origin of the torques or torque changes or of the gradients of the torque changes, and yet generally not substantially in excess of such requirements and (b) a new and improved system for effecting the tilting of the rollers for speed ratio change purposes.

While I have illustrated in one of my embodiments the association of my improved arrangement (a) above with a system of races and rolling bodies in which the rollers are tilted for speed ratio change purposes, it will be understood that this has been done because of the fact that it is in such relationship that feature (a) serves its function most peculiarly; so also I have illustrated in another embodiment, the association of my new arrangement (b) for tilting the rollers with my new arrangement (a) for pressure developing application, because the former serves its function most advantageously and peculiarly in such association. It will, however, be understood that my invention is not necessarily limited to the incorporation of both features into a unitary mechanism or to the employment of the former in a transmission in which the speed ratio can be changed.

Figure 1:
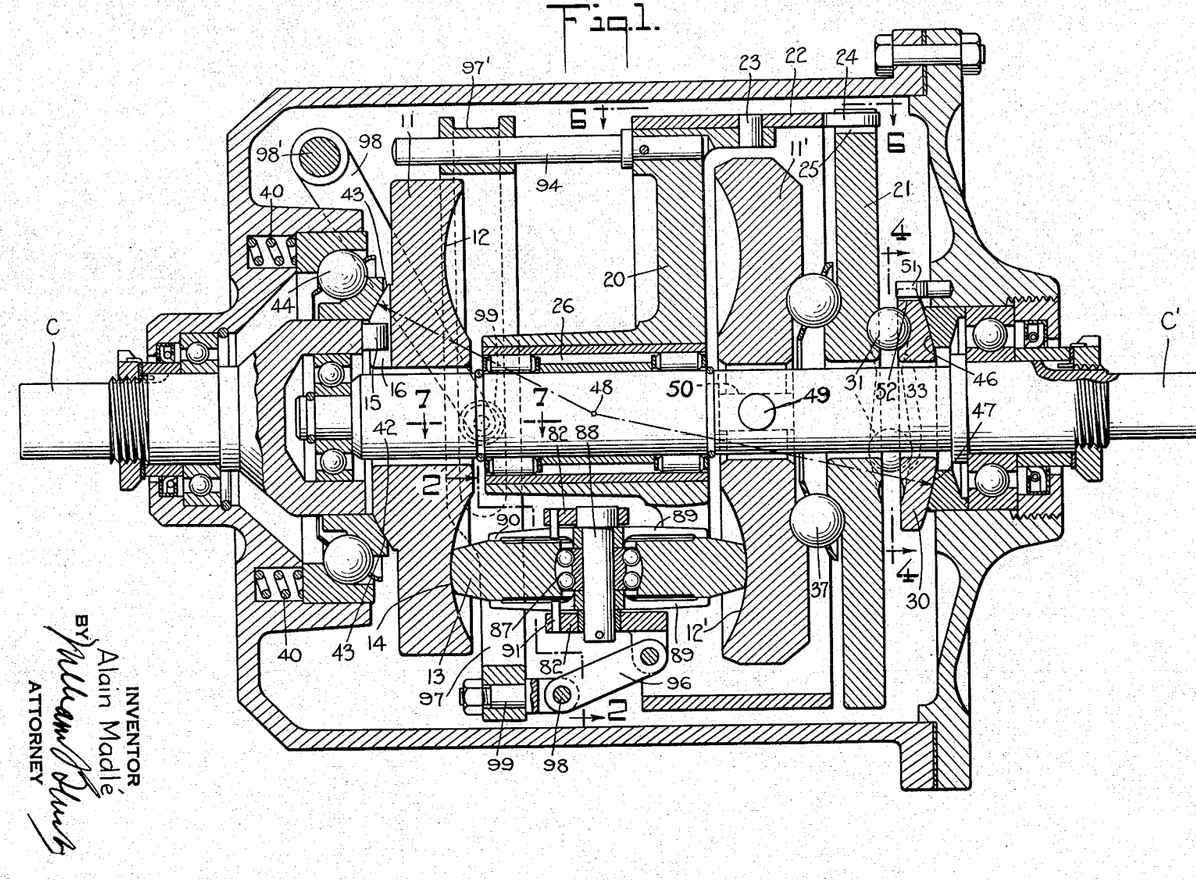
Figure 1 is a longitudinal section through the main axis of the transmission.

Upon viewing Figure 1 of the drawings, I show at the left a rotating member C, and at the right a rotating member C', either of which may serve as the power input or driving member, in which event the other will serve as the power output or driven member, and it will be understood, as this description is read, that it is immaterial which is the driven member, and which is the driving member, and one can be the driving member for one moment, and the other the driving member at another moment. In fact, as will appear, it is an important feature of my invention that my structure is so devised.

However, for purposes of convenience of description herein, the rotating member C will be assumed to be the power input member, that is, the driving member, and the member C' will be assumed to be the power output member, or the driven member, although it will again be emphasized that this is only for the purpose of convenience of reference.

Figure 5:
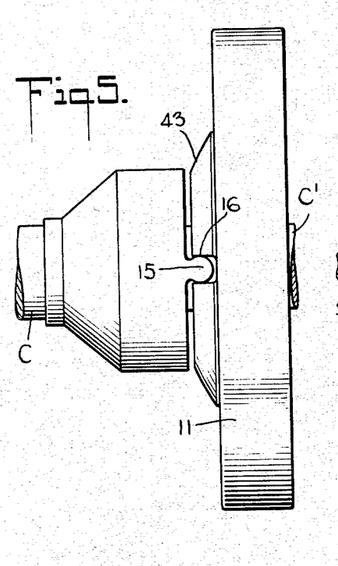
Figure 5 shows a detail.

The torque is transmitted from the driving shaft C to the race ring 11 in any preferred or desired manner, as for example, by the connection shown in Figures 1 and 5 wherein a projection or projections 15 carried by the shaft C are received in grooves 16 formed in the race ring 11.

The torque is then transmitted from the race ring 11 to the race ring 11' by means of the rollers 13. The race ring 11' is connected to the driven shaft C' preferably in the manner to be hereinafter set forth, to complete the driving connection between the input and output ends of the transmission system.

An adhesive system of the character herein illustrated requires the application to the points of adhesive contact between the races and the rollers, of the required pressure to establish the adhesive driving connection, and this required pressure will vary with the torque and where the speed ratio of the system is variable, will also vary with the change in the ratios.

I will now describe my arrangement for developing and applying to the points of adhesive contact an axial component which is sufficient for the requirements and for compensating for the changes in elastic deformations in the transmission system due to changes in pressures in the system which occur with changes in load or in the speed ratio, and before describing this new arrangement, I will premise that while it contemplates that for transmitting motion, the races shall be the moving members and the roller system shall be stationary, yet it also contemplates that the roller system shall be capable of a sufficient oscillation for compensating for the aforementioned elastic deformations in the manner shortly to be pointed out.

The rollers 13 are supported in a carriage 20 which takes the form of a spider, and the rollers form with this spider or carriage a unitary assembly which will hereinafter be referred to as the roller system. The spider 20 is coupled to a disc 21 in any preferred or desired manner, as for example, by the arrangement shown in Figures 1 and 6 wherein an annulus 22 secured to the carriage as for example by pins 23 has projecting rearwardly therefrom, the engaging elements 24 shown in the form of rounded knobs or ends received in the axial grooves 25 formed on the rim of the disc 21.

The spider or carriage 20 is mounted on one of the driving shafts for free rotation thereabout in any preferred or desired manner as for example by the bearing 26.

The disc 21 forms an element of my pressure developing system which has hereinbefore been referred to as the torque-loading device and which I will now describe.

Figures 2, 3, 4:
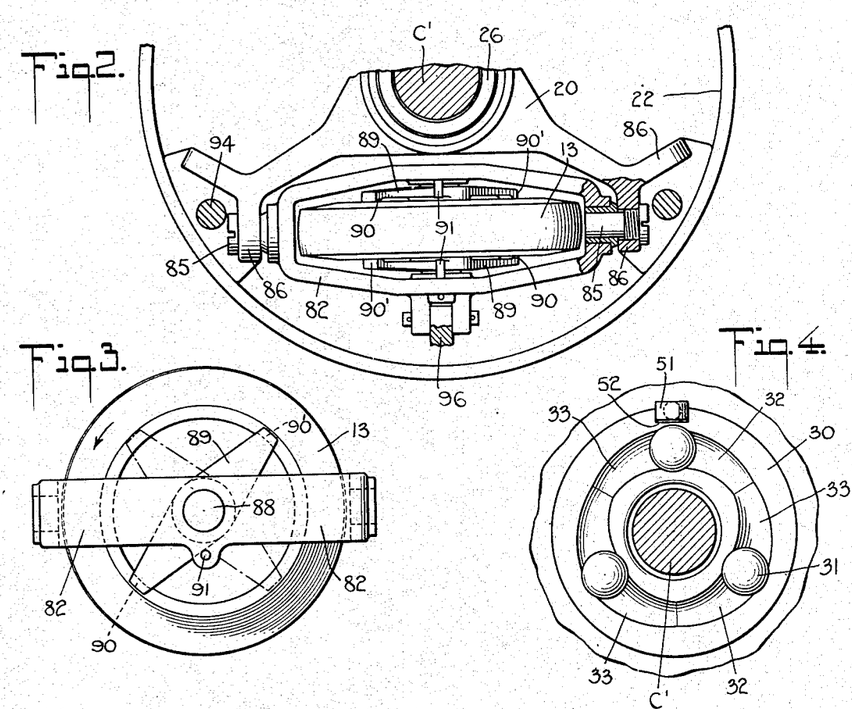
Figure 2 is a section taken on line 2—2 of Figure 1.
Figure 3 is a front elevational view of a detail.
Figure 4 is a transverse section taken on line 4—4 of Figure 1 looking in the direction of the arrow.

Upon viewing Figures 1 and 4 of the drawings, it will be observed that this torque-loading device comprises the disc 30 and the aforementioned disc 21 and rolling bodies such as balls 31 received therebetween. The discs 21 and 30 are each provided on their adjacent faces with complementary grooves of the character shown more fully in Figure 4 of the drawings. Each groove is so shaped as to provide inclined surfaces 32 and 33 along the pitch line to opposite sides of each ball and where for example three balls are employed as illustrated in Figure 4 then there will be three such sets of inclined surfaces for the groove in each member. Each of the inclined surfaces is part of a helix.

The disc 30 is held against rotation as for example, by means of the element 51 carried by the frame and engaging in a slot 52 in the periphery of this disc.

A torque-loading member of the character herein set forth connected with the roller system generally in the manner set forth will respond to torques applied to the carriage of the roller system and therefore can be expressed as the reaction of the forces present in the system, and therefore my new arrangement can be described as a torque-loading device responsive to the reaction of all the torques present in the system.

The axial component developed by this torque-loading device is transmitted to the points of adhesive contact of the system through the races 11 by means of the thrust bearing system shown generally at 37.

For establishing an initial driving connection between the members of the system of races and rolling bodies, I show at 40 the employment of springs for this purpose, operating in the manner that will be set forth more fully hereinafter.

With the springs functioning as set forth in the preceding paragraph, the application of a torque at either end of the system, for example, at the input end C will, as a result of the adhesive relationship between the races and the rolling bodies, immediately set up a reaction in the roller system which will manifest itself in the development through the disc 21 of a pressure which will be applied as aforementioned to the system of races and rolling bodies, and with changing loads, this reaction will always give a pressure sufficient for changing requirements. These changing pressures incident to changes in the load and also incident to changes in the speed ratios, where the speed ratio is changed, will give rise to elastic deformations in the members of the system of races and rolling bodies, and these elastic deformations will be compensated for by a displacement of the roller system functioning for compensating purposes through the torque-loading device, so that the roller system can be pictured as oscillating angularly with increases and decreases of elastic deformations incident to increases and decreases of pressure requirements, and as a feature of my invention, I have supported the carriage to permit of such oscillations and so connected it with the torque-loading devices as to cause these oscillations to provide proper compensation.

A system of this character depending as it does upon the application of pressure to a plurality of points of adhesive contact will function efficiently only to the extent to which the pressures are distributed in balanced relation and I will now describe my arrangement for accomplishing this.

This arrangement generally can be described as making races and rolling bodies, and the associated parts, self-aligning as an entirety and furthermore as providing for this self-alignment about a point which might be referred to as the resultant of all the points of adhesive contact between the races and rolling bodies, and furthermore providing that the parts of the system are each made self-aligning about its point. I will now describe the arrangement whereby this is done.

The race ring 11 is supported for free movement with reference to the shaft C' and is held to a spherical alignment by means of the contacting spherical surfaces 42, 43 and the thrust of this race ring is taken up by the angular thrust bearing 44. These spherical surfaces 42 and 43 not only serve to carry race ring 11 for self-alignment but also to self-align the thrust. The race ring 11' which forms part of the assembly of which the thrust bearing 37, the disc 21 and the disc 30 form the other parts, is mounted for self-alignment by the engagement of the projecting ends 49 of a pin, transverse through the shaft C', in the elongated slots 50 formed oppositely on the bore of the race 11', and this assembly is also mounted for universal alignment about the shaft C' by means of spherical bearing surfaces 46 and 47, and the spherical bearing surfaces 42, 43, 46 and 47 are generated about the same point indicated at 48, which point is intended to be the resultant of the points of contact of the races and rolling bodies and I have attempted to show this by means of the dotted lines and the arrows.

Figure 6:
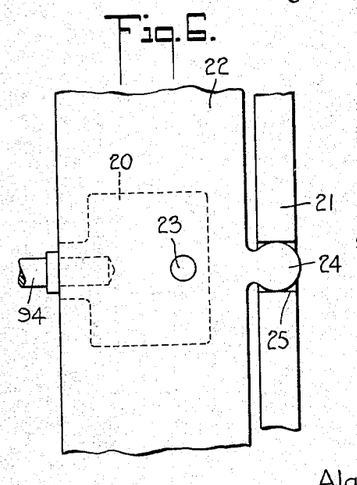
Figure 6 is a section taken on line 6—6 of Figure 1.
Figure 7:
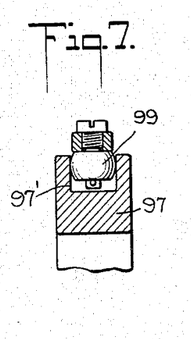
Figure 7 is a section taken on line 7—7 of Figure 1.

In order that the universal adjustment of the system may be attained without interference, the engaging relationships such as shown in 15, 16 in Figure 5, and 24 and 25 in Figure 6 and at 51 and 52 in Figure 1, are all by means of engaging surfaces properly designed for this purpose.

It has already been set forth that the reaction produced by the torques existing in the system upon the carriage are relied upon to set up the pressures and that the movement of the carriage is relied upon to set up compensations for the changes in the elastic deformations in the system and the latter feature becomes of particular importance in connection with a system of this character in which the speed ratio is changed.

It is for this reason that I have illustrated at the bottom of Figure 1 an arrangement wherein the speed ratio is varied by a tilting of the rollers and before describing the details of my arrangement for attaining this variation, I will premise that (1) the variation is attained by change of leverage between the elements of the system; (2) the change in leverage is attained by the tilting of the rollers, and (3) the tilting of the rollers is attained first by an angling of the rollers about their points of adhesive contact with the races and the action of the races upon the rollers as long as they remain angled, to give them a rolling movement to successively new positions of tilt until the desired change in tilt has been reached.

For this purpose, the rolling bodies take the forms of rollers 13, the contacting surfaces of which are generated specifically to permit these rollers to maintain a proper adhesive contact with the toric surfaces of the races as they are tilted and are, therefore, of a transverse radius not in excess of, and preferably smaller than, the transverse curvature of the toric faces 12 and 12', and the centers of the rollers are shown as in the locus or path of a circle that generates these toric surfaces.

Upon viewing Figures 1 and 2 of the drawings, it will be observed that rollers 13 are each carried in a frame 82 mounted for pivotal movement about an axis diametrical of the roller and perpendicular to the axis through the point of adhesive contact of each roller with the races, as by means of pins 85 about which the frame 82 swivels. The pins in turn are mounted in ears 86, (see Figure 2) fixedly related to and carried by the cage 20.

To impose upon the rollers the aforementioned angling movement so as to position each roller angularly of its normal path of travel, and thus permit the rotation of the races to translate the rollers to successively new positions as the races rotate, I employ an arrangement which comprises generally a universal support for each roller and means controlled by the tilting of the frames 82 to cause each roller to angle in that direction determined by the direction of tilting of the frame, and in Figures 1, 2 and 3, this universal support for each roller is attained by mounting it upon a self-aligning bearing 87 carried by the pin 88 which in turn is supported from the frame 82. In this manner, the roller 13 can assume any position relatively to the frame within the limits fixed by the design.

In Figures 2 and 3 is shown the arrangement by which an angling movement is given to the rollers by the frames 82. This arrangement comprises members 89 adjacent the rollers. These members are mounted intermediate their ends about the pins 88 of the rollers, each member being provided at its terminal ends with the inwardly directed projections 90 and 90' so arranged as to be closely adjacent to the annular ridge formed on the face of each roller. While the members 89 are free to swing about the pins 88 this swinging movement is limited to a movement of these members from their full line position shown in Figure 3 to the dotted line position shown in this figure, and this I accomplish by the provision of pins 91 carried by the frames 82 and presented in the path of swinging movement of the members 89.

The direction of movement of the frames 82 about the axis of the pins 85 will therefore determine which projection 90 or 90' of each member 89 is moved into contact with the roller, and the direction of the rolling movement of the roller will determine which of the two positions shown in Figure 3 the members 89 will assume.

The roller frames 82 and their attendant and associated parts are all supported from the roller carrier or cage 20 which bears about the rotating member C', as shown in Figure 1, and is held against rotation in the specific manner and for the added purposes to be hereinafter referred to, in any preferred or desired manner.

The frames 82 are moved angularly in any preferred or desired manner as by control levers or links 96 which in turn are operated simultaneously and in unison by the regulating ring 97, to which each of the links 96 is connected as by a pivot 98 carried by a bolt 99, which is shown as fixedly associated with the ring 97. The ring 97 in turn is supported for rectilinear movement along the axis of the transmission in any preferred or desired manner, as for example, by the bolts 94 carried by and extending from the cage 20.

The rectilinear movement may be imparted to the controlling ring 97 in any preferred or desired manner.

In Figure 1 I have illustrated one arrangement for controlling the movement of the ring 97. This arrangement comprises the annular channel 97' formed on the exterior surface of the disc 97 and in which is received the roller 99' carried at the free end of the lever 98" operated by the shaft 98', and which in turn may be operated in any preferred or desired manner.

It will be assumed that the roller 13 is rotating in the direction shown by the arrow in Figure 3, in which event the member 89 will be in the position shown in full lines in this figure, and any angular movement given to the frame 82 will cause the projection 90 to be moved into contact with the roller to tilt the roller about an axis diametrically through the point of adhesive contact of the races therewith.

To provide a balanced turning movement for each roller by forces applied to opposite faces of the rollers, I duplicate the members 89 to each side of each roller so as to provide two such members for each roller. Upon any angling of the frame 82, the roller will be tilted through members 89 positioned to opposite sides thereof and acting together to angle the roller in the same direction and to the same extent.

If the frame 82 is moved angularly while the roller 13 is moving in the direction opposite to that shown by the arrow in Figure 3 the turning movement of the roller will occur exactly as above set forth and in a direction dependent upon the direction of the angular movement of the frame 82.

Upon a continued tilting of the frame 82 by the disc 97, the members 89 will move the roller angularly to increasing extents. Due to this change in its angular position, the roller will roll diagonally across the face of the races to change its tilt. The controlling member 97 is moved, as set forth, until a tilt of the rollers is reached to give the desired speed change. When the controlling disc stops moving, however, the rollers will continue to move diagonally and in such movement will move away from that pressure-applying projection 90 or 90' of each member 89 which has been causing it to angle, and will move into contact with the pressure-applying projections on the members to the other side of the pins 88 and in such movement will act in connection with the projections on that side, in the same manner as it did in connection with the initiation of the angling movement, to cause a restoration of the rollers to a position in the normal path of their travel.

In Figures 8 to 15 I have shown an embodiment of my invention wherein the mechanism for tilting the rollers is different from that shown in Figure 1 in a number of respects among which are the following:

1. One of the rollers only is moved angularly for initiating the speed ratio change, and angular movement of the other rollers hereinafter referred to as the follower rollers for this purpose is automatically performed by the transmission apparatus so that in this manner the control of the angling movement of the rollers is simplified and made easier. As to this advantage my arrangement of Figures 8 to 15 is of general application to systems of this character regardless of whether or not the reaction torque-loading is employed.

2. The elimination by the invention of the embodiment of Figure 8 of the frictional resistances inherent in the operation of the master and the follower rollers in the manner shown in Figure 1 removes from the system a variant upon the accurate functioning of the carriage so that the only variant upon such functioning left is the action of the remote control upon the master roller.

Figures 8, 9, 10, 11, 12, 13, 14:
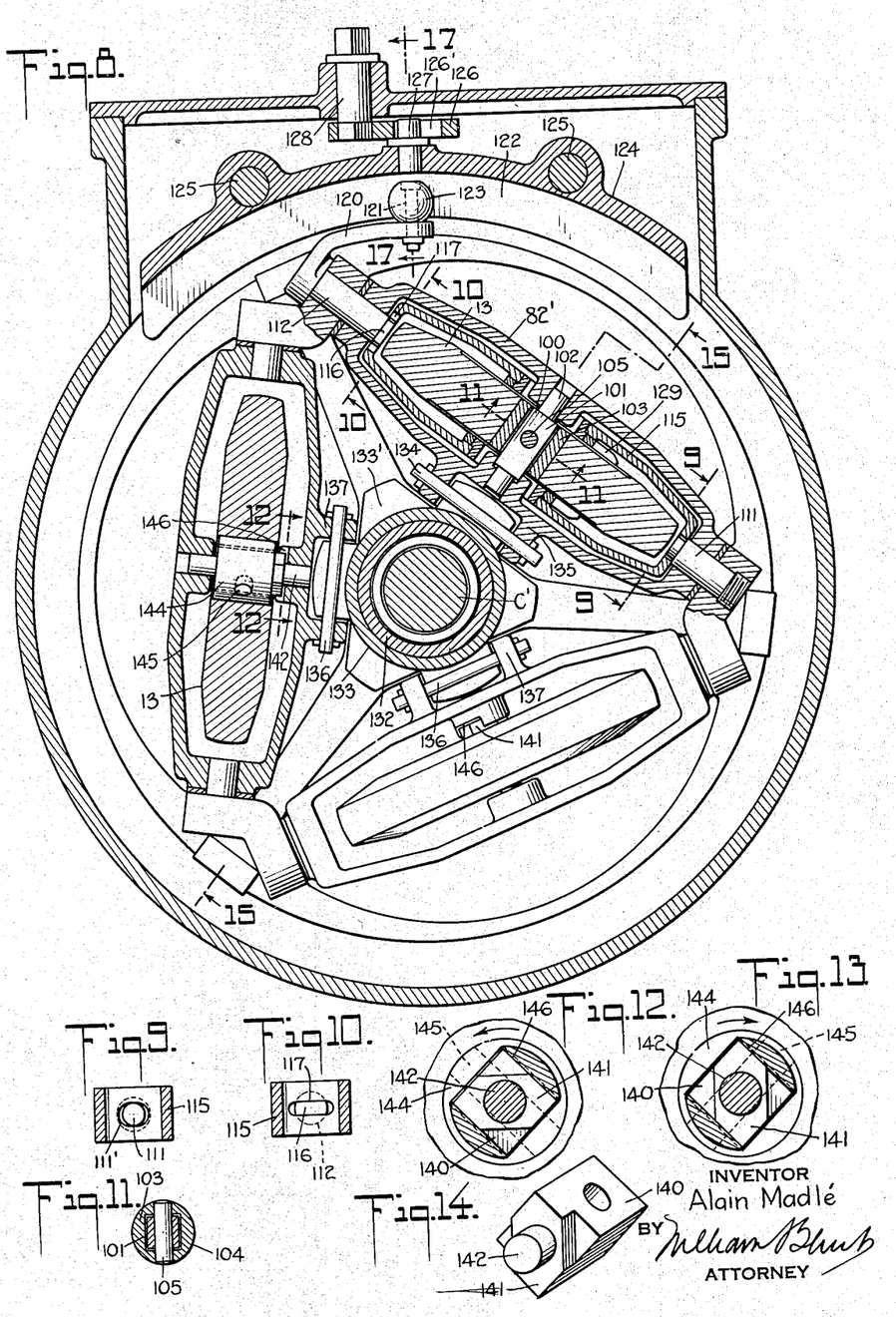
Figure 8 is a cross section through the roller carriage system of another embodiment of my invention.
Figure 9 is a cross section of a detail taken on line 9—9 of Figure 8.
Figure 10 is a cross section of a detail taken on line 10—10 of Figure 8.
Figure 11 is a cross-section of a detail taken on line 11—11 of Figure 8.
Figure 12 is a cross-section of a detail taken on line 12—12 of Figure 8.
Figure 13 shows the detail of Figure 12 with a different position of the parts.
Figure 14 is a perspective of a detail.

The roller system of Figure 8 comprises three rollers one of which is the master roller and the other two the follower rollers.

Figure 15:
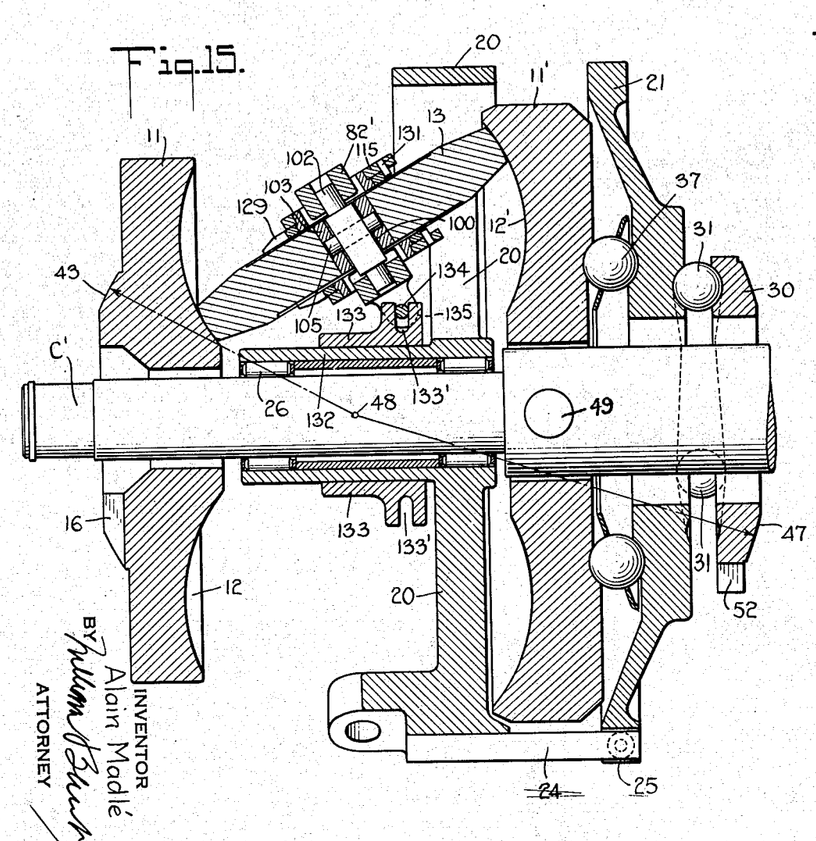
Figure 15 is a cross section taken on line 15—15 of Figure 8.
Figure 16:
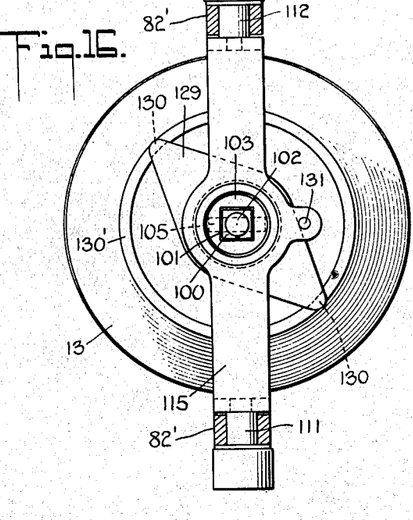
Figure 16 is a side elevational view of the master roller and the controlling frame.
Figure 17:
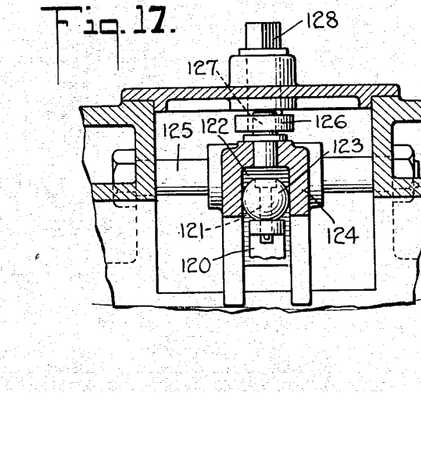
Figure 17 is a cross-section of a detail taken on line 17—17 of Figure 8.

The master roller 13 shown in Figures 8 and 15 is supported on a pin assembly shown in Figures 11, 15 and 16. This pin assembly comprises a roller shaft 100 which is generally squared as shown at 101 and has pins 102 projecting from each end. 103 is the bearing which has its bore squared so as to receive the squared section 101 therewithin and is made cylindrical externally as shown at 104. The bearing 103 is pinned to the squared shaft 101 as shown at 105. Upon viewing these figures it will be observed that sufficient play is allowed in the square fit between the members 103 and 101 so as to allow the bearing member 103 and the roller carried thereby to move angularly relatively to the shaft and about the swivel pin 105 and therefore about the points of adhesive contact between the races and rolling bodies because the pin 105 is fixed so as to be diametric of such points of adhesive contact. The pins 102 are in turn supported in the roller frame 82', which in turn is supported in the spider by means of the pivot pins 111 and 112 so that the frame 82' can swivel about the axis through these pins. Between the roller and the supporting frame 82' is mounted the controlling frame 115, (see Figures 8 and 16). This controlling frame is mounted upon the pins 111 and 112 so as to rotate about the axis of these two pins. It is, however, free to rotate relatively to the pin 111 but is engaged to rotate with the pin 112 by means of the flattened end 116 of the pin 112 received in the elongated slot 117 formed in the end of the controlling frame 115.

Secured to the pin 112 is the lever 120 which carries at its free end the upwardly directed projection 123 which is shown as in the form of a ball freely received for rotation on the pin 121 carried by the lever 120. This ball is received in the arcuately shaped groove 122 formed in the member 124 which is guided for rectilinear movement by the bolts 125 carried by the housing. Member 124 is shifted rectilinearly by means of the crank 126 which has therein the slot 126' in which is received the pin 127 carried by the member 124. The crank 126 in turn is operated in any preferred or desired manner as for example by the shaft 128.

In this manner the member 124 is given the parallel reciprocation so as to permit the lever 120 to freely angle for purposes of angling the controlling frame 15, and the arrangement shown permits of the proper functioning of the reciprocating movement of the member 124 to give an angling movement to the member 120.

The angling movement given to the member 120 will give a corresponding angling movement to the controlling frame 115, and this angling movement of the controlling frame will cause one or the other of the projections 130 of the member 129 in accordance with the direction of turn of the roller to apply pressure to the ridge 130' formed on the roller 13 just as set forth in connection with the embodiment of Figure 1 and a pin 131 carried by the frame 115 will cooperate with the member 129 also just as in the embodiment of Figure 1.

It will be understood, of course, that here also the member 129 and its associated parts may be duplicated for the opposite side of the roller.

In this manner the master roller 13 will be given a translating movement across the face of the races to cause it to tilt and in such tilting operation will carry with it the roller frame 82' and this roller frame in turn will tilt the frames of the other two rollers in the manner I will now describe.

The pin 111 of the controlling frame is received in the enlarged opening 111' (see Figure 9).

Slidably mounted upon the bearing extension 132 of the carriage is the annulus 133. This annulus is provided with annular groove 133' in which is received a pin 134 carried by the ears 135 projecting from the frame 82' of the master roller so that any tilting of the frame of the master roller will initiate a sliding movement of the annulus 133. The follower roller frames are similarly provided with pins 136 carried in ears 137 and which pins are received also in annular groove 133'. The sliding movement of the annulus 133 resulting from the tilting of the master roller frame 82' will in turn cause a simultaneous tilting of the two follower roller frames exactly in accordance therewith.

I will now describe my arrangement whereby the tilting of the frames of the follower rollers will initiate an angular movement of the follower rollers themselves.

The pin assembly of each follower roller is shown in Figures 12, 13 and 14. This pin assembly comprises the squared center piece 140 beveled off as shown in Figure 14 so as to provide a head 141 and the projecting pins 142. This square shaft is received in a square bore of a roller bearing 144, which is like the roller pin 103 in the master roller pin assembly, and both are connected by the swivel pin 145 answerable to the swivel pin 105 in the master roller pin assembly. The pin assembly of the follower roller distinguishes itself from the pin assembly of the master roller in that the head 141 is received in the groove 146 so that it can assume one of two extreme positions 90° apart. This control groove 146 in the follower frame is inclined at an angle of 45° to the axis diametric of points of adhesive contact. The swivel pin 145 will be at an angle of 45° to this axis and either to one side or the other thereof.

The position of the head 141 and therefore of the pin assembly will depend upon the direction of rotation of the roller but whichever way the roller is rotated, it will be at 45° to the axis diametrically through the points of adhesive contact.

With this condition of the parts, if a turning movement is given to the frame about its axis this will cause the roller to angle about the points of contact simultaneously with the angling of the master roller.

Having thus described my invention and illustrated its use, what I claim as new and desire to secure by Letters Patent is:

1. A transmission comprising torque-transmitting members, races associated with said members so as to transmit torques passing through said members, a system of rollers in adhesive rolling contact with said races so as to transmit torques therebetween, and a mounting for said races whereby they are made automatically self-aligning about a common center.

2. A transmission comprising torque-transmitting members, races associated with said members so as to transmit torques passing through said members, a system of rollers in adhesive rolling contact with said races so as to transmit torques therebetween, and a mounting for said races whereby they are made automatically self-aligning about a common center positioned in a plane passing through the rolling bodies.

3. A transmission comprising torque-transmitting members, races associated with said members, so as to transmit torques passing through said members, a system of rollers in adhesive rolling contact with said races so as to transmit torques therebetween, said races being associated with bearing members provided with spherical bearing surfaces in contact with complementary spherical surfaces one of which is associated with said torque-transmitting members and another of which is associated with the frame of the transmission, said surfaces all having a common center, whereby said races are automatically self-aligning about a common center.

4. In combination, a rotatable driving shaft, a rotatable driven shaft and means for driving one shaft from the other comprising a system of interacting races and rolling bodies operatively associated with said shafts, said races being mounted so as to rotate with said shafts, and said rolling bodies being in adhesive driving contact with said races, so as to transmit power therebetween, a member movable by the reaction forces between the rollers and the races, a torque-loading device for developing and applying the required pressure to the points of adhesive contact of the races and rolling bodies to maintain the adhesive driving contact thereof, means operative between said member and said torque-loading device whereby torques in said member are transmitted to said torque-loading device and means operative between said torque-loading device and one of the races for transmitting pressure thereto, and a mounting for said torque-loading device and associated race whereby they are adapted for limited displacement so as to be self-aligning as an assembly with reference to the rolling bodies.

5. In a power transmission, for transmitting power from a rotating driving member to a rotating coaxial driven member, a system of races and rolling bodies, said races being operatively associated with said members and said rolling bodies being located between said races and adapted to transmit power from one to the other by adhesive rolling contact, an element for carrying said rolling bodies, means for generating axial pressures to maintain adhesive contact between said races and rolling bodies in response to torques transmitted to it, said means comprising a member movable with said element and adapted to transmit torques from said element to said means, means to transmit axial pressures generated by said axial pressure generating means to said last-mentioned race, and mountings for said means, said member and said last-mentioned race whereby they are adapted for self-aligning adjustment about a point coinciding with the resultant of the points of contact of the races and rolling bodies.

6. In a power transmission for transmitting power from a rotating driving member to a rotating coaxial driven member, a system of races and rolling bodies, said races being operatively associated with said members and said rolling bodies being located between said races and adapted to transmit power from one to the other by adhesive driving contact, a mounting for one of said races whereby it may move axially toward the other race, an element for carrying said rolling bodies, means for generating axial pressures to maintain the adhesive driving contact between said races and rolling bodies in response to torques transmitted to it, said means comprising a member movable with said element and adapted to transmit torques from said element to said means, means to transmit axial pressures generated by said axial pressure generating means to said movable race, and a mounting for said member whereby it is adapted for self-aligning adjustment.

7. In a power transmission for transmitting power from a rotating driving member to a rotating coaxial driven member, a system of races and rolling bodies, said races being operatively associated with said members and said rolling bodies being located between a pair of races and adapted to transmit power from one to the other by adhesive rolling contact, a mounting for one of said races whereby it may move axially toward the other race, an element for carrying said rolling bodies, means for generating axial pressures to maintain adhesive rolling contact between said races and rolling bodies in response to torques transmitted to it, said means comprising a member movable with said element and adapted to transmit torques from said element to said means, means to transmit axial pressures generated by said axial pressure generating means to said movable race, and a mounting for said member whereby it is adapted for self adjustment by movement transverse to the axis of the said races.

8. In a power transmission system, a pair of opposed coaxial rotatable toric races, and rollers therebetween and in adhesive driving contact therewith, for transmitting power from one of said races to the other, a mounting for one of said races whereby it is adapted to move toward the other race, a member positioned between said races in which said rollers are journalled, a mounting for said member whereby it is adapted to pivot about the axis of the races, means for converting torque into axial pressure and for applying it to said movable race so as to cause it to move toward the other race and thereby to maintain the adhesive driving contact between said races and rollers, said means being positioned externally of the race and roller system, and an operative connection between said member in which said rollers are journalled and said pressure means, whereby the torques acting on said member are transmitted to said torque converting means and converted into an axial pressure, said connection being effected along a path external to the periphery of the race that is positioned between said member and said torque converting means.

9. In a power transmission system, a fixed support, a pair of opposed coaxial toric races rotatably mounted in relation to said support, and rollers between said races and in adhesive driving contact therewith for transmitting power from one of said races to the other, a mounting for one of said races whereby it is adapted to move toward the other race, a member positioned between said races in which said rollers are journalled, a mounting for said member whereby it is adapted to pivot about the axis of the races, means for converting torque into axial pressure and for applying it to said movable race so as to cause it to move toward the other race and thereby to maintain the adhesive driving contact between said races and rollers, said means being positioned externally of the race and roller system, and between one of the races and the fixed support, and an operative connection between said member in which said rollers are journalled and said pressure generating means, whereby the torques acting on said frame are transmitted to said torque converting means and converted into an axial pressure, said connection being effected along a path external to and surrounding the periphery of said last-mentioned race.

10. In a power transmission system, a fixed support, a pair of opposed coaxial toric races rotatably mounted in relation to said support, and rollers between said races and in adhesive driving contact therewith for transmitting power from one of said races to the other, a mounting for one of said races whereby it is adapted to move toward the other race, a member positioned between said races in which said rollers are journalled, a mounting for said member whereby it is adapted to pivot about the axis of the races, means for converting torque into axial pressure and for applying it to said movable race so as to cause it to move and thereby to maintain the adhesive driving contact between said races and rollers, said means being positioned externally of the race and roller system, and between one of the races and the fixed support, and an operative connection between said member in which said rollers are journalled and said pressure generating means, whereby the torques acting on said frame are transmitted to said torque converting means and converted into an axial pressure, said connection being effected along a plurality of paths symmetrically arranged exteriorly of the periphery of the race that is positioned between the member and said torque converting means.

11. In a power transmission system, a fixed support, a pair of opposed coaxial toric races rotatably mounted in relation to said support, and rollers between said races and in adhesive driving contact therewith for transmitting power from one of said races to the other, a mounting for one of said races whereby it is adapted to move toward the other race, a member positioned between said races in which said rollers are journalled, a mounting for said member whereby it is adapted to pivot about the axis of the races, means for converting torque into axial pressure and for applying it to said movable race so as to cause it to move and thereby to maintain the adhesive driving contact between said races and rollers, said means being positioned externally of the race and roller system and between one of the races and the fixed support, and an operative connection between said member in which said rollers are journalled and said pressure generating means, whereby the torques acting on said frame are transmitted to said torque converting means and converted into an axial pressure, said connection being effected along a path external to and surrounding the periphery of said last mentioned race by interengaging surfaces adapted to permit universal relative adjustment.

12. In a power transmission system, a fixed support, a pair of opposed coaxial toric races rotatably mounted in relation to said support, and rollers between said races and in adhesive driving contact therewith for transmitting power from one of said races to the other, a mounting for one of said races whereby it is adapted to move toward the other race, a member positioned between said races in which said rollers are journalled, a mounting for said member whereby it is adapted to pivot about the axis of the races, means for converting torque into axial pressure and for applying it to said movable race so as to cause it to move and thereby to maintain the adhesive driving contact between said races and rollers, said means being positioned externally of the race and roller system and between one of the races and the fixed support, and an operative connection between said member in which said rollers are journalled and said pressure generating means, whereby the torques acting on said frame are transmitted to said torque converting means and converted into an axial pressure, said connection being effected along a path external to and surrounding the periphery of said last mentioned race by interengaging surfaces adapted to permit relative sliding.

13. In a power transmission system of the race and roller type, a rotatable member, a race mounted on said member for rotation therewith but free to slide in relation thereto, a second race coaxially surrounding said member and freely rotatable relatively thereto, means preventing axial movement of said second race with relation to said member, said races being of the toric type, a system of rollers between said races and in adhesive driving contact therewith for transmitting power from one of said races to the other, a carrier for said rollers adapted to move under the action of the resultant torque passing through the rollers, means for converting torques into axial pressure, said means being positioned to one side of said first mentioned race and externally to the race and roller system, means for transmitting the torque from said carrier to said axial pressure generating means, and means intermediate said axial pressure generating means and said first mentioned race whereby axial pressures from said axial pressure generating means are transmitted to said first-mentioned race but torques are not transmitted.

14. In a power transmission system of the race and roller type, a fixed support, a rotatable member journalled in said support, a race mounted on said member for rotation therewith but free to slide in relation thereto, a second race coaxially surrounding said member and freely rotatable relative thereto, means on said support for preventing axial movement of said second race, said races being of the toric type, a system of rollers between said races and in adhesive driving contact therewith for transmitting power from one of said races to the other, a carrier for said rollers, means for converting torques into axial pressure, said means being positioned to one side of said first mentioned race and externally to the race and roller system and between the same and a portion of said support, means for transmitting the torques from said carrier to said axial pressure generating means, and means intermediate said axial pressure generating means and said first mentioned race whereby axial pressures from said axial pressure generating means are transmitted to said first mentioned race but torques are not transmitted.

15. In a power transmission system of the toric race and roller type, a rotatable driven member, and a rotatable driving member coaxial therewith, the end of one of said members being provided with a recess and carrying within said recess a bearing within which is journalled the end of the other of said members, said other member being surrounded by a pair of opposed toric races, a mounting for one of said races comprising a keyed connection with said other member whereby it is constrained to rotate therewith but is free to slide in relation to said member, a driving connection between the other of said races and said bearing-carrying member, rollers between said races and in adhesive driving contact therewith for transmitting power from one of said races to the other, a yieldable carrier for said rollers and means associated with said yieldable carrier and adapted to move and to become operative when said carrier yields, for converting the torques passing therethrough into an axial pressure and for applying said axial pressure to one of said races so as to maintain the adhesive driving contact between said races and rollers.

16. In a power transmission system of the toric race and roller type, a fixed support, a rotatable driven member and a rotatable driving member coaxial therewith journalled in said support, the end of one of said members being journalled within the end of the other of said members, said one member being surrounded by a pair of opposed toric races, a mounting for one of said races comprising a keyed connection with said one member whereby it is constrained to rotate therewith but is free to slide in relation thereto, and a mounting for the other of said races whereby it is rotatable in relation to said member, a driving connection between said last named race and said other member, rollers between said races and in adhesive driving contact therewith for transmitting power from one of said races to the other, a carrier for said rollers, an abutment on said fixed support for preventing movement of said last named race away from the rollers, and means associated with said roller carrier and having a portion thereof located between said first named race and said fixed support for converting the torques passing therethrough into an axial pressure and for applying said axial pressure to one of said races so as to maintain the adhesive driving contact between said races and rollers, said last named means being adapted to move and to become operative when said carrier yields.

17. In a friction transmission of the toric race and roller type, two coaxially opposed toric surfaces and rollers therebetween, a mounting for one of said rollers comprising a frame free to tilt and a bearing for said roller supported by said frame for free angling movement about an axis passing through the contact points of the roller with the races but restricted to tilt in unison with said frame, a second frame tiltable independently of said first frame and operator operable means for tilting this second frame, a roller engaging element carried by said second frame so as to be capable of rotational movement in the direction of rotation of the roller and means for limiting said rotational movement to a predetermined arc.

18. In a friction transmission system of the toric race and roller type, coaxially opposed toric surfaces and rollers therebetween, a mounting for one of said rollers comprising a frame free to tilt and a bearing for said roller carried by said frame so as to be capable of free angling movement about an axis passing through the contact points of the roller with the races, means for causing said bearing to tilt in unison with the said frame, a second frame tiltable independently of said first frame and operator operable means for tilting said second frame, a roller engaging element carried by said second frame so as to be capable of rotational movement in the direction of rotation of the roller and a stop for limiting said rotational movement to a predetermined arc, said element being spaced only slightly from part of the surface of the roller, so as to engage the roller whenever the said second frame is tilted.

ALAIN MADLE.